(12) United States Patent
Bushman (10) Patent No.: US 9,361,301 B1
(45) Date of Patent: Jun. 7, 2016

(54) DETECTING MODIFICATIONS TO A STORAGE THAT OCCUR IN AN ALTERNATE OPERATING ENVIRONMENT

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/706,654

(22) Filed: May 7, 2015

(51) Int. Cl.
*G06F 17/30* (2006.01)

(52) U.S. Cl.
CPC .... *G06F 17/30073* (2013.01); *G06F 17/30082* (2013.01)

(58) Field of Classification Search
None
See application file for complete search history.

(56) References Cited

U.S. PATENT DOCUMENTS

| | | | | |
|---|---|---|---|---|
| 7,725,428 | B1 * | 5/2010 | Hawkins | G06F 11/1469 |
| 8,990,164 | B1 * | 3/2015 | Mahajan | G06F 11/1469 |
| | | | | 707/649 |
| 2005/0050106 | A1 * | 3/2005 | Wenner | G06F 17/3048 |
| 2007/0157315 | A1 * | 7/2007 | Moran | G06F 21/52 |
| | | | | 726/23 |
| 2010/0077165 | A1 * | 3/2010 | Lu | G06F 11/1451 |
| | | | | 711/162 |
| 2014/0082415 | A1 * | 3/2014 | Schlarb | G06F 11/14 |
| | | | | 714/15 |

* cited by examiner

*Primary Examiner* — James Trujillo
*Assistant Examiner* — Aida Tessema
(74) *Attorney, Agent, or Firm* — Maschoff Brennan (57) ABSTRACT

Detecting modifications to a storage that occur in an alternate operating environment. In one example embodiment, a method for detecting modifications to a storage that occur in an alternate operating environment may include tracking, in a modify map, modifications to a storage that occur during operation of a primary operating environment, identifying a first most recent transaction identifier in a journal of a file system of the storage prior to closing of the storage by the primary operating environment, upon opening of the storage by the primary operating environment, identifying a second most recent transaction identifier in the journal, determining that the second most recent transaction identifier does not match the first most recent transaction identifier, concluding that the storage was modified in an alternate operating environment between the closing and the opening of the storage by the primary operating environment, and invalidating the modify map.

20 Claims, 4 Drawing Sheets

DETECTING MODIFICATIONS TO A STORAGE THAT OCCUR IN AN ALTERNATE OPERATING ENVIRONMENT

FIELD

The embodiments disclosed herein relate to detecting modifications to a storage that occur in an alternate operating environment.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by copying the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

As noted above, each successive image backup of a source storage may include only those blocks of the source storage that were modified subsequent to the point in time of the prior image backup. In order to easily back up only modified blocks during the creation of an image backup, it may be useful to track which blocks are modified between a point in time of a prior image backup and a point in time of a subsequent image backup, instead of determining which blocks are modified by performing a full compare of every block in the source storage with corresponding blocks in image backups that were previously created.

Modifications to a source storage may be tracked while the source storage is accessed by an operating environment, such as an operating system. A record of these modifications may then be saved to persistent storage when the operating system is shut down, and then later loaded from the persistent storage when the operating system is again rebooted, thereby providing persistent modification tracking across reboots of the operating system.

One common problem with persistent modification tracking across reboots of an operating system is a lack of reliability due to multiple operating environments accessing the source storage. For example, if an alternate operating environment, such as a pre-boot virus scanner that is separate from the operating system mentioned above, is granted access to the source storage between the shutdown and reboot of the operating system, the tracking of modifications made to the source storage may not be performed due to the pre-boot virus scanner not having the same tracking capabilities as the operating system. Consequently, modifications to the source storage that are made during the operation of the pre-boot virus scanner may not be tracked and therefore not be reflected in the persistent modification tracking record. Hence, the persistent modification tracking record that is loaded from the persistent storage upon reboot of the operating system may be incomplete because it will be missing modifications made to the source storage by the pre-boot virus scanner, and the creation of any subsequent image backup that is based on this persistent modification tracking record will have a data integrity problem because it will also be missing these modifications.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to detecting modifications to a storage that occur in an alternate operating environment. The example embodiments disclosed herein may be employed to track modifications to a storage in a modify map, and also to detect where modifications have been made to the storage without being tracked in the modify map in order to invalidate the modify map. Where the modify map has been invalidated, any subsequent creation of an image backup may result in a valid image backup without any data integrity problems because the invalid modify map will not be relied on during the creation of the image backup.

In one example embodiment, a method for detecting modifications to a storage that occur in an alternate operating environment may include tracking, in a modify map, modifications to a storage that occur during operation of a primary operating environment, identifying a first most recent transaction identifier in a journal of a file system of the storage prior to closing of the storage by the primary operating environment, upon opening of the storage by the primary operating environment, identifying a second most recent transaction identifier in the journal, determining that the second most recent transaction identifier does not match the first most recent transaction identifier, concluding that the storage was modified in an alternate operating environment between the closing and the opening of the storage by the primary operating environment, and invalidating the modify map.

In another example embodiment, a method for detecting modifications to a storage that occur in an alternate operating environment may include tracking, in a modify map, modifications to a storage that occur during operation of a primary operating environment, calculating a first checksum of file system metadata of a file system of the storage prior to closing of the storage by the primary operating environment, upon opening of the storage by the primary operating environment, calculating a second checksum of the file system metadata of the file system of the storage, determining that the second checksum does not match the first checksum, concluding that the storage was modified in an alternate operating environment between the closing and the opening of the storage by the primary operating environment, and invalidating the modify map.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full backup" as used herein refers to a full backup of a storage that includes at least a copy of each unique allocated block of the storage at a point in time such that the full backup can be restored on its own to recreate the state of the storage at the point in time, without being dependent on any other backup. A "full backup" may also include nonunique allocated blocks and free blocks of the storage at the point in time. An example file format for a "full backup" is the ShadowProtect Full (SPF) image backup format. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial full backup of the storage, can be restored together as an incremental image backup chain to recreate the state of the storage at the subsequent point in time. An "incremental backup" may also include nonunique allocated blocks and free blocks of the storage that were modified between the previous point in time and the subsequent point in time. An example file format for an "incremental backup" is the ShadowProtect Incremental (SPI) image backup format. The term "modified block" as used herein refers to a block that was modified either because the block was previously allocated and changed or because the block was modified by being newly allocated and changed. The term "decremental backup" as used herein refers to an at least partial backup of a storage that includes at least a copy of each unique allocated block from a full backup of the storage that corresponds to a block that was modified in the source storage between a previous point in time and a subsequent point in time, such that the decremental backup, along with all subsequent decremental backups of the storage, including a full backup of the storage, can be restored together as a decremental image backup chain to recreate the state of the storage at the previous point in time. A "decremental backup" may also include nonunique allocated blocks and free blocks from a full backup of the storage that correspond to blocks that were modified in the source storage between the point in time and the subsequent point in time. It is understood that a "full backup," an "incremental backup," and/or a "decremental backup" may exclude certain undesired allocated blocks such as blocks belonging to files whose contents are not necessary for restoration purposes, such as virtual memory pagination files and machine hibernation state files.

Figure 1:
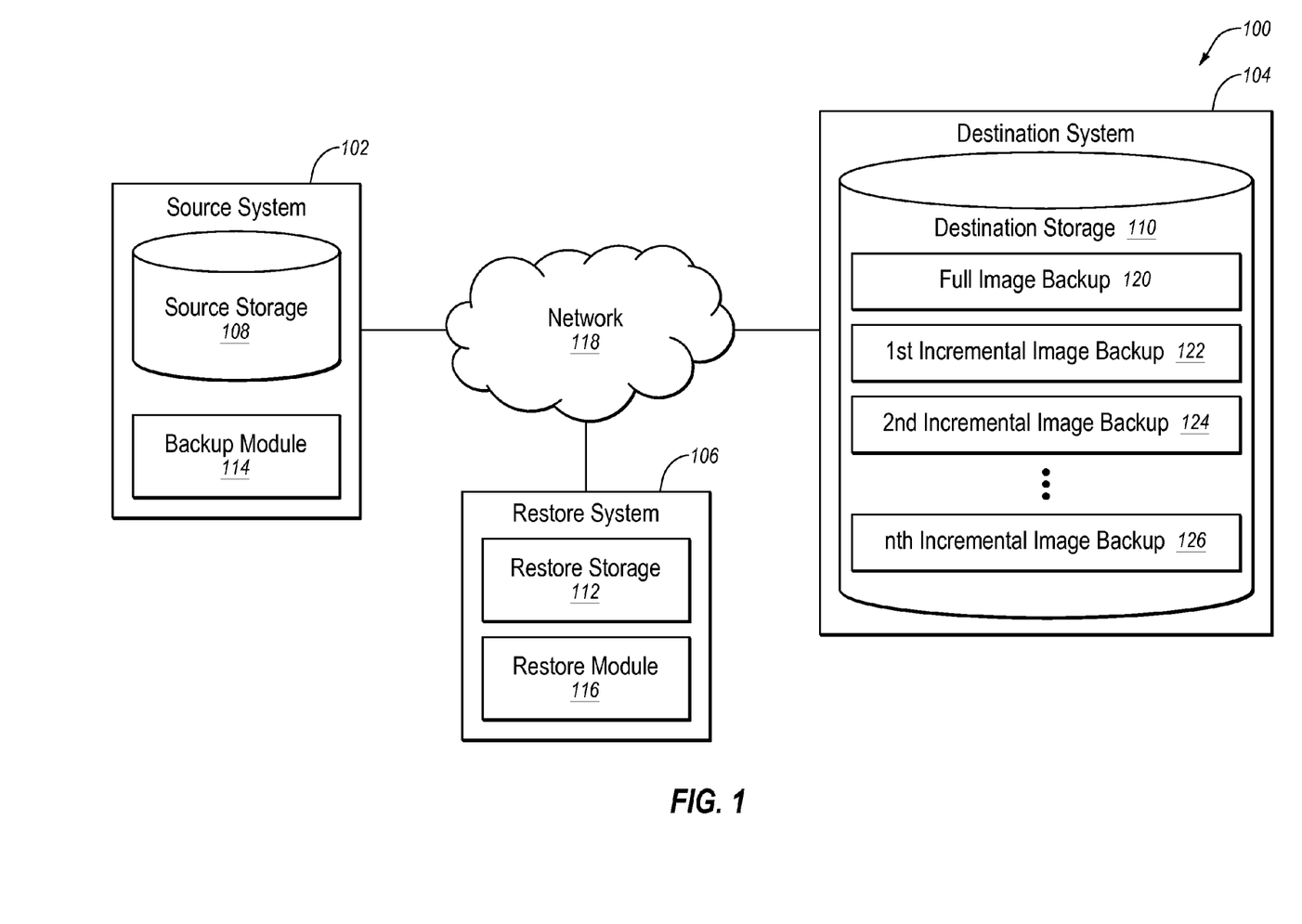
FIG. 1 is a schematic block diagram illustrating an example image backup and restore system.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114 and the restore system 106 may also include a restore module 116. The systems 102, 104, and 106 may be configured to communicate with one another over a network 118.

The destination storage 110 may store one or more image backups of the source storage 108. For example, the destination storage 110 may store a full image backup 120, a 1st incremental image backup 122, a 2nd incremental image backup 124, and an nth incremental image backup 126, which together make up an incremental image backup chain. The full image backup 120 may represent the state of the source storage at time t(1), the 1st incremental image backup 122 may represent the state of the source storage at time t(2), the 2nd incremental image backup 124 may represent the state of the source storage at time t(3), and the nth incremental image backup 126 may represent the state of the source storage at time t(n+1). Any of the image backups 120-126 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 118 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 118 may also be a network emulation of a hypervisor over which one or more virtual machines may communicate.

The incremental image backup chain stored in the destination storage 110 may be created by the backup module 114. For example, the backup module 114 may be one or more programs that are configured, when executed, to cause one or more processors to perform image backup operations of creating a full image backup and multiple incremental image backups of the source storage 108. It is noted that these image backups may initially be created on the source system 102 and then copied to the destination system 104.

For example, the full image backup 120 may be created to capture the state of the source storage 108 at time t(1). This image backup operation may include the backup module 114 copying all unique allocated blocks of the source storage 108 as allocated at time t(1) and storing the unique allocated blocks in the destination storage 110, or verifying that the unique allocated blocks are already stored in the destination storage 110. The state of the source storage 108 at time t(1) may be captured using the snapshot technology in order to capture the blocks stored in the source storage 108 at time t(1) without interrupting other processes, thus avoiding downtime of the source storage 108. The full image backup 120 may be relatively large depending on the size of the source storage 108 and the number of allocated blocks at time t(1). As a result, the full image backup 120 may take a relatively long time to create and consume a relatively large amount of space in the destination storage 110.

Next, the 1st and 2nd incremental image backups 122 and 124 may be created to capture the states of the source storage 108 at times t(2) and t(3), respectively. This may include copying only modified unique allocated blocks of the source storage 108 present at time t(2) and storing the modified unique allocated blocks in the destination storage 110, or verifying that the modified unique allocated blocks are already stored in the destination storage 110, then later copying only modified unique allocated blocks of the source storage 108 present at time t(3) and storing the modified unique allocated blocks in the destination storage 110, or verifying that the modified unique allocated blocks are already stored in the destination storage 110. The states of the source storage 108 at times t(2) and t(3) may also be captured using the snapshot technology, thus avoiding downtime of the source storage 108. Each incremental image backup may include only those unique allocated blocks from the source storage 108 that were modified after the time of the previous image backup. Thus, the 1st incremental image backup 122 may include only those unique allocated blocks from the source storage 108 that were modified between time t(1) and time t(2), and the 2nd incremental image backup 124 may include only those unique allocated blocks from the source storage 108 that were modified between time t(2) and time t(3). In general, as compared to the full image backup 120, each incremental image backup may take a relatively short time to create and consume a relatively small storage space in the destination storage 110.

Finally, the nth incremental image backup 126 may be created to capture the state of the source storage 108 at time t(n+1). This may include copying only modified unique allocated blocks of the source storage 108 present at time t(n+1) using snapshot technology, and storing the modified unique allocated blocks in the destination storage 110, or verifying that the modified unique allocated blocks are already stored in the destination storage 110. The nth incremental image backup 126 may include only those unique allocated blocks from the source storage 108 that were modified between time t(n) and time t(n+1).

Therefore, incremental image backups of the source storage 108 may be created on an ongoing basis. The frequency of creating new incremental image backups may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup by applying the image backups to the restore storage 112 from oldest to newest, namely, first applying the full image backup 120 and then applying each successive incremental image backup up to the particular incremental image backup. Alternatively, the blocks from the source storage 108 can be restored to the state at the point in time of a particular incremental image backup by applying the image backups to the restore storage 112 concurrently, namely, concurrently applying the full image backup 120 and each successive incremental image backup up to the particular incremental image backup.

Although only allocated blocks are included in the example incremental image backups discussed above, it is understood that in alternative implementations both allocated and free blocks may be backed up during the creation of a full image backup or an incremental image backup. This is typically done for forensic purposes, because the contents of free blocks can be interesting where the free blocks contain data from a previous point in time when the blocks were in use and allocated. Therefore, the creation of full image backups and incremental image backups as disclosed herein is not limited to allocated blocks but may also include free blocks.

Further, although only full image backups and incremental image backups are discussed above, it is understood that the source storage 108 may instead be backed up by creating a full image backup and one or more decremental image backups. Decremental image backups are created by initially creating a full image backup to capture the state at an initial point in time, then updating the full image backup to capture the state at a subsequent point in time by modifying only those blocks in the full image backup that were modified between the initial and subsequent points in time. Prior to the updating of the full image backup, however, any original blocks in the full image backup that correspond to the modified blocks are copied to a decremental image backup, thus enabling restoration of the source storage 108 at the initial point in time (by restoring the updated full image backup and then restoring the decremental image backup) or at the subsequent point in time (by simply restoring the updated full image backup). Since restoring a single full image backup is generally faster than restoring a full image backup and one or more incremental or decremental image backups, creating decremental image backups instead of incremental image backups may enable the most recent image backup to be restored more quickly since the most recent image backup is always a full image backup instead of potentially being an incremental image backup. Therefore, the methods disclosed herein are not limited to implementation on incremental image backup chains, but may also include implementation on decremental image backup chains.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 118 may include the internet. In this example embodiment, the first desktop computer may be configured to periodically back up the volume of the first desktop computer over the internet to the network server as part of a backup job by creating the full image backup 120 and the multiple incremental image backups 122, 124, and 126 stored in the destination storage 110. The first desktop computer may also be configured to track incremental changes to its volume between backups in order to easily and quickly identify only those blocks that were modified for use in the creation of an incremental backup. The second desktop computer may also be configured to restore one or more of the image backups from the network server over the internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 118, it is understood that the systems 102, 104, and 106 may instead communicate directly with each other. For example, in some embodiments any combination of the systems 102, 104, and 106 may be combined into a single system. Further, although the backup module 114 and the restore module 116 are the only modules disclosed in the system 100 of FIG. 1, it is understood that the functionality of the modules 114 and 116 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
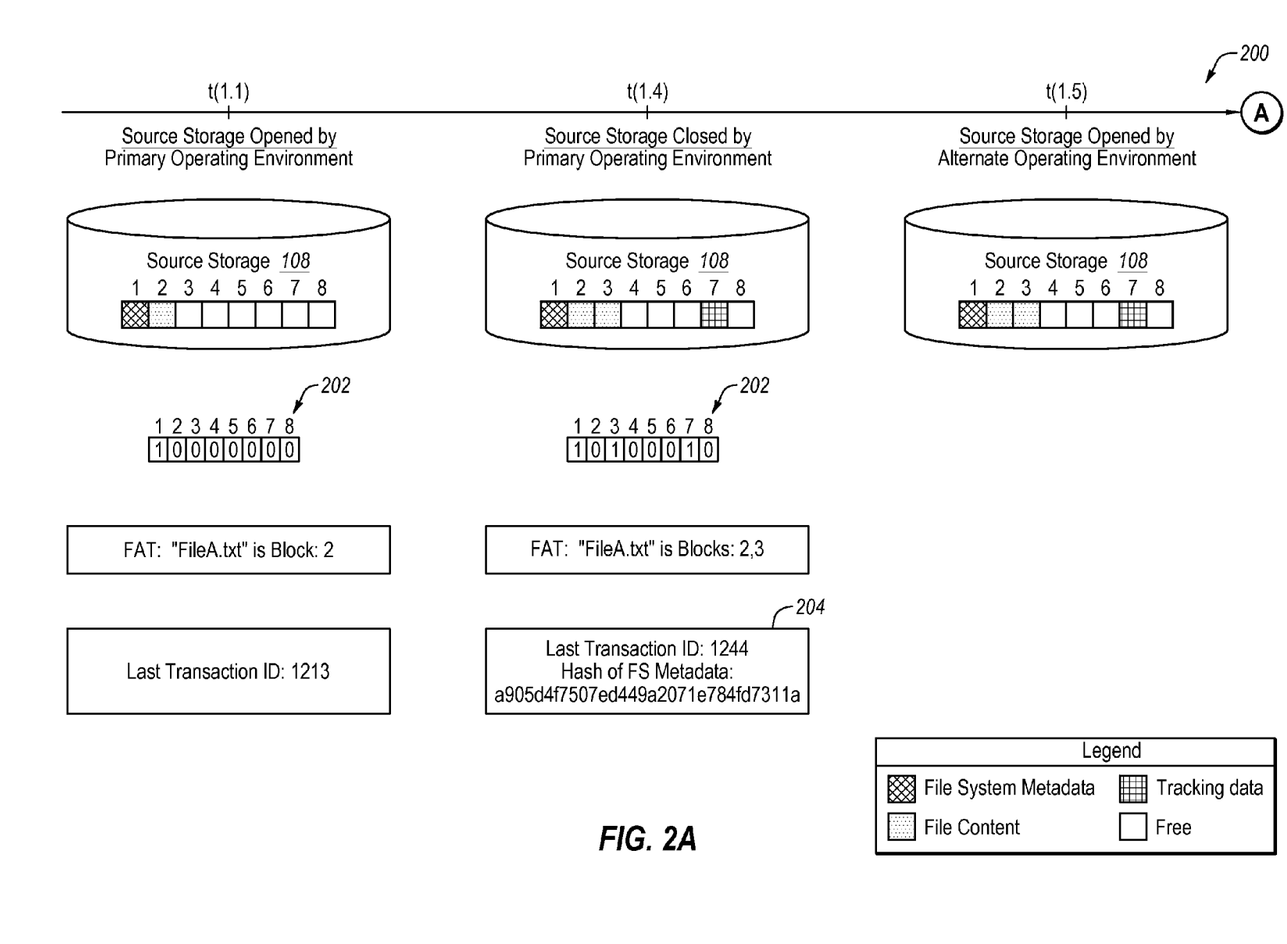
FIGS. 2A-2B are a schematic block diagram illustrating a timeline of detecting modifications to a storage that occur in an alternate operating environment.
Figure 2B:
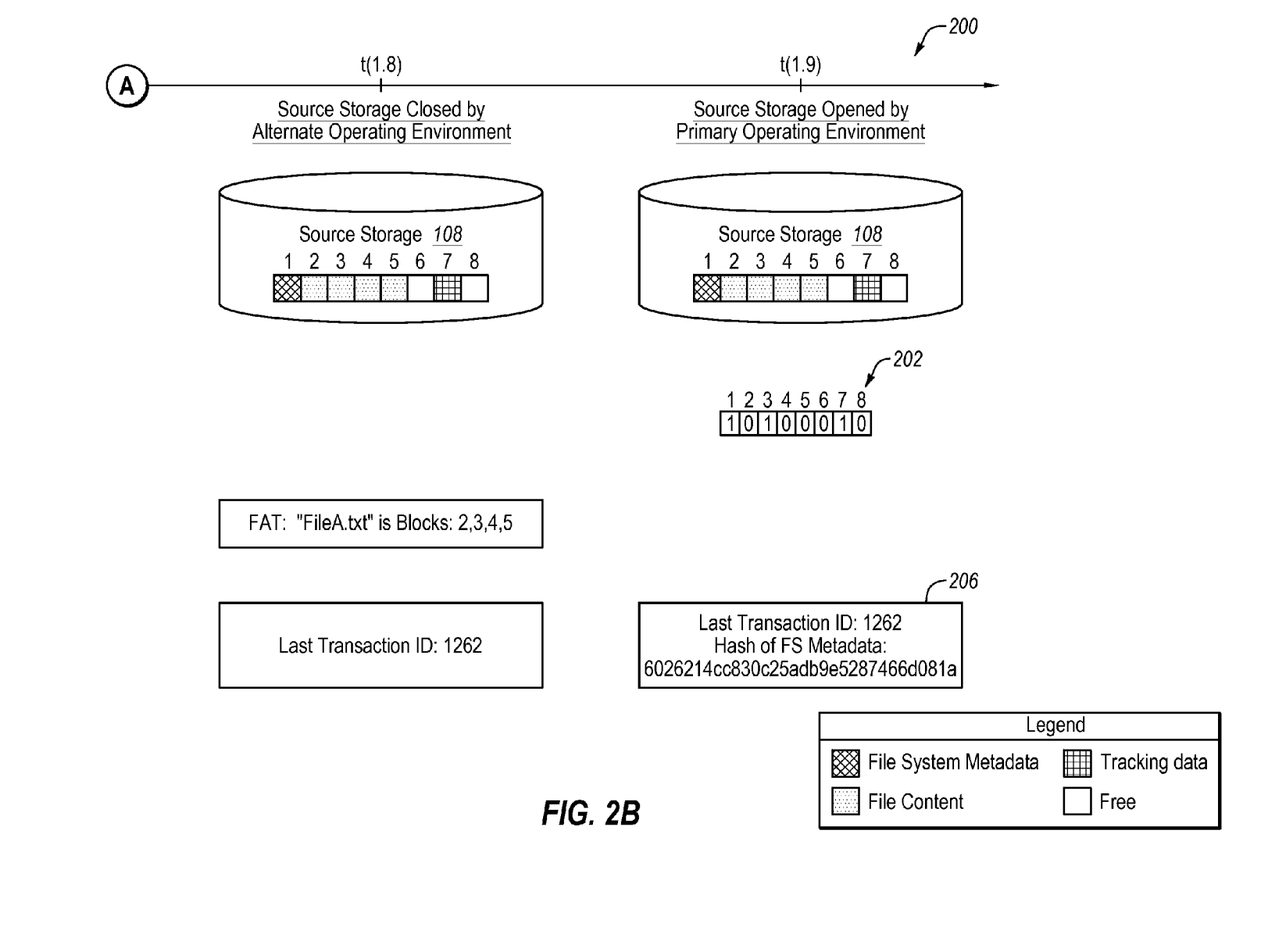

FIGS. 2A-2B are a schematic block diagram illustrating a timeline 200 of detecting modifications to a storage that occur in an alternate operating environment. In particular, the timeline 200 of FIGS. 2A-2B disclose the states of the source storage 108 at times t(1.1), t(1.4), t(1.5), t(1.8), and t(1.9). As noted previously, the full image backup 120 represents the state of the source storage 108 at time t(1) and the 1st incremental image backup 122 represents the state of the source storage at time t(2). As disclosed in FIGS. 2A-2B, allocated blocks in the source storage 108 are illustrated with a hatch pattern and free blocks are illustrated as blank. Further, blocks in modify map 202 are represented with a '1' bit for modified blocks and with a '0' bit for unmodified blocks. The modify map 202 may be employed to track some or all blocks that are modified in the source storage 108 between time t(1) and time t(2).

As disclosed in FIG. 2A, the state of the source storage 108 at time t(1.1) includes allocated blocks in positions (1) and (2) and free blocks at positions (3), (4), (5) (6), (7), and (8). Previously, at time t(1), a snapshot may have been activated on the source storage 108 and then, during the creation of the full image backup 120, the original blocks in positions (1) and (2) may have been copied to the full image backup 120 using the snapshot in order to capture the blocks stored in the source storage 108 at time t(1) without interrupting other processes, thus avoiding downtime of the source storage 108. Meanwhile, any blocks that are modified between time t(1) and time t(2) may be tracked in the modify map 202, which may be used later in creating the 1st incremental image backup 122 at time t(2).

At time t(1.1) the source storage 108 is opened by a primary operating environment. For example, the primary operating environment may be a standard operating system, such as Microsoft Windows 8.1 Professional, running on the source system 102 and the source storage 108 may be an operating system volume that is opened by the operating system, for example, by mounting the operating system volume upon booting of the operating system. It is understood, however, that the primary operating environment may be any other type of operating environment that is capable of opening the source storage 108, such as a pre-boot virus scanner or a boot environment. It is further understood that the source storage may be any other type of storage, such as a data volume, which can be opened, by mounting for example, and later closed, by dismounting for example, at any time, including multiple times, completely independent of the booting or shutting down of a standard operating system. As used herein, the term "mount" refers to a storage being accessed for reads and/or writes by an operating environment.

At time t(1.4), the source storage 108 is closed by the primary operating environment. For example, where the primary operating environment is a standard operating system and the source storage 108 is an operating system volume, the closing of the source storage 108 may occur as the standard operating system is shutting down.

Between the opening of the source storage 108 at time t(1.1) and the closing of the source storage 108 at time t(1.4), modifications to the source storage that occur during operation of the primary operating environment are tracked in the modify map 202. For example, between time t(1.1) and time t(1.4), the content of file "FileA.txt" grew from being found only in position (2) to being found in positions (2) and (3), which results in a modification to the block in position (3) and modifications to the file system metadata found in position (1). It is understood that the file system metadata may be positioned in any block position or block positions of the source storage 108, and is not limited to being positioned in position (1). Further, tracking data written in position (7) results in a modification to position (7). Since the blocks in positions (1), (3), and (7) are modified between time t(1.1) and time t(1.4), by time t(1.4) the modify map at time t(1.4) has been updated to add a '1' bit to positions (1), (3), and (7). The tracking of modifications using the modify map 202 may be performed by the backup module 114 that executes upon the opening of the source storage 108 by the standard operating system and prior to any writes by the standard operating system to the source storage 108.

Just prior to the closing of the source storage 108 by the primary operating environment at time t(1.4), the modify map 202 may be persistently written to the source storage 108 as part of the tracking data stored at position (7). In this manner, upon the primary operating environment again opening the source storage 108, the modify map 202 may be accessed and the tracking of modifications by the backup module 114 may continue. However, where modifications are made to the source storage 108 by an alternate operating environment, as discussed below, the modify map 202 may be invalid. The example methods disclosed herein may enable such modifications to be detected in order to invalidate the modify map 202 and thereby avoid data integrity problems in subsequent image backups of the source storage 108.

In particular, in addition to storing the modify map 202 in the tracking data in position (7) of the source storage 108, the backup module 114 may also store modify map validity data 204 in position (7). This modify map validity data 204 may include a most recent transaction identifier in a journal (also known as a log) of a file system of the source storage 108. This most recent transaction identifier may be represented by a "Last Transaction ID" of "1244." The term "most recent transaction identifier" as used herein refers to any combination of information related to the most recent transaction that may be used to identify the transaction up to, and including the entire transaction. Additionally or alternatively, this modify map validity data 204 may be a calculated checksum of file system metadata of a file system of the source storage 108. This calculated checksum may be a hash of any portion of the file system metadata that is stored in the block in position (1), such as a hash calculated on a journal portion, known as a log in a New Technology File System (NTFS) file system, of the file system metadata, represented by a hash value of "a905d4f7507ed449a2071e784fd7311a." It is understood that the calculated checksum could be a simple checksum, a CRC value (including, but not limited to, a CRC-32 value), a hash value (including, but not limited to, an MD5, SHA-1, SHA-256, and SHA-512 hash value), or some combination thereof. It is understood that the most recent transaction identifier in a journal of a file system of the source storage 108, and/or file system metadata of the source storage 108, may be read from the source storage 108 and/or may be read from a snapshot of the source storage 108, in order to generate the modify map validity data 204. It is also understood that the modify map 202 and/or the modify map validity data 204 may be stored outside of the source storage 108 and/or stored in free space of the source storage 108 such that the actual location(s) of the modify map 202 and/or the modify map validity data 204 may not be noted in the modify map 202

By storing the modify map validity data 204 just prior to closing the source storage 108, the backup module 114 may access this modify map validity data 204 upon reopening of the source storage 108 to determine whether any modifications to the source storage 108 occurred in the intervening time period without being tracked in the modify map 202. This scenario is illustrated in FIGS. 2A-2B, where at time t(1.5), an alternate operating environment, such as a standard operating system, a pre-boot virus scanner, or a boot environment, opens the source storage 108. Then, as disclosed in FIG. 2B, prior to the closing of the source storage 108 by the alternate operating environment at time t(1.8), the alternate operating environment modifies the source storage 108 by adding blocks in positions (4) and (5) to the file "FileA.txt," which results in modifications to blocks in positions (4) and (5) and modifications to the file system metadata found in position (1). However, in the scenario of FIGS. 2A-2B, the backup module 114 does not run during operation of the alternate operating environment, which results in these modifications not being tracked in the modify map that is stored in position (7). Although the modify map 202 as stored at time t(1.4) already reflects that the block in position (1) has been modified, the modifications to the blocks in positions (4) and (5) are not tracked in the modify map 202, and if the modify map 202 were to be subsequently relied upon at time t(2) during the creation of the 1st incremental image backup 122, the blocks in positions (4) and (5) would not be included, resulting in a data integrity problem in the 1st incremental image backup 122.

For this reason, at time t(1.9) when the source storage 108 is again opened by the primary operating environment, new modify map validity data 206 is again identified, and then compared to the modify map validity data 204 that was stored in position (7) to determine whether the data matches. If the data matches, the backup module 114 may conclude that the source storage 108 was not modified in an alternate operating environment between the closing at time t(1.4) and the opening at time t(1.9) of the source storage 108 by the primary operating environment, and the modify map 202 may continue to be employed for tracking modifications to the source storage 108. However, if the data does not match, the backup module 114 may conclude that the source storage 108 was modified in an alternate operating environment between the closing at time t(1.4) and the opening at time t(1.9) of the source storage 108 by the primary operating environment, and the modify map 202 may be invalidated and no longer employed for tracking modifications to the source storage 108.

For example, where the modify map validity data 204 and the modify map validity data 206 include a most recent transaction identifier in a journal of a file system of the source storage 108, the previously stored "Last Transaction ID" of "1244" may be compared to a newly identified most recent transaction identifier in a journal, such as the "Last Transaction ID" of "1262." Since these transaction identifiers do not match, the backup module 114 may conclude that the alternate operating environment made modifications to the source storage 108 between the closing at time t(1.4) and the opening at time t(1.9) of the source storage 108 by the primary operating environment, and as a result the backup module 114 may invalidate the modify map 202. Similarly, where the modify map validity data 204 and the modify map validity data 206 include a calculated checksum of file system metadata of a file system of the source storage 108, the previously stored hash value of "a905d4f7507ed449a2071e784fd7311a" may be compared to a newly calculated checksum, such as a hash value of "6026214cc830c25adb9e5287466d081a." Since these checksums do not match, the backup module 114 may conclude that the alternate operating environment made modifications to the source storage 108 between the closing at time t(1.4) and the opening at time t(1.9) of the source storage 108 by the primary operating environment, and as a result the backup module 114 may invalidate the modify map 202. By invalidating the modify map 202, employment of the modify map 202 may be discontinued, thus avoiding data integrity problems in the 1st incremental image backup 122 that is created at time t(2). It is understood that the most recent transaction identifier in a journal of a file system of the source storage 108, and/or file system metadata of the source storage 108, may be read from the source storage 108 and/or may be read from a snapshot of the source storage 108, in order to generate the modify map validity data 206.

Figure 3:
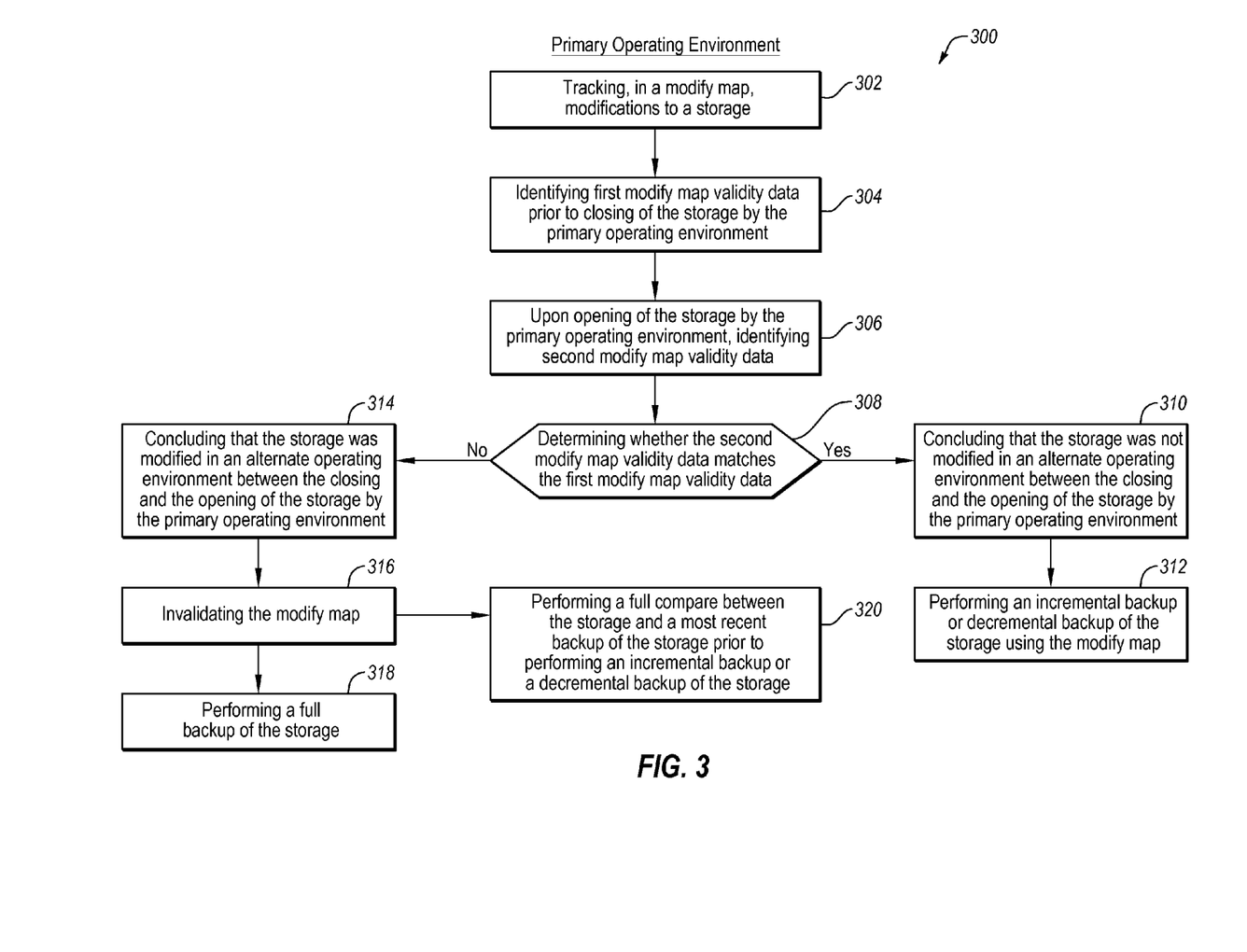
FIG. 3 is a schematic flowchart illustrating an example method for detecting modifications to a storage that occur in an alternate operating environment.

FIG. 3 is a schematic flowchart illustrating an example method 300 for detecting modifications to a storage that occur in an alternate operating environment. The method 300 may be implemented, in at least some embodiments, by the backup module 114 of FIG. 1. For example, the backup module 114 may be one or more programs, stored on one or more non-transitory computer-readable media, that are configured, when executed, to cause one or more processors to perform operations of detecting modifications to a storage that occur in an alternate operating environment, as represented by one or more of steps 302-320 of the method 300. Although illustrated as discrete steps, various steps may be divided into additional steps, combined into fewer steps, reordered, or eliminated, depending on the desired implementation. Also, prior to the method 300, various image backups, such as full, incremental, or decremental image backups, may have been created of the source storage 108 and then stored in the destination storage 110. As noted in FIG. 3, the method 300 is performed during operation of a primary operating environment. The method 300 will now be discussed with reference to FIGS. 1-3.

The method 300 may include step 302 of tracking, in a modify map, modifications to a storage. For example, the backup module 114 of FIG. 1 may track, at step 302, modifications to the blocks in positions (1), (3), and (7) of the source storage 108 in the modify map 202 between time t(1.1) and time t(1.4) during operation of the primary operating environment, as disclosed above in connection with FIG. 2A. The primary operating environment may be a standard operating system, and the tracking at step 302 may be performed by the backup module 114 that executes upon opening the source storage 108 within the standard operating system and prior to any writes by the standard operating system to the source storage 108.

The method 300 may include step 304 of identifying first modify map validity data prior to closing of the storage by the primary operating environment. Continuing with the above example, the backup module 114 of FIG. 1 may identify, at step 304, the modify map validity data 204 prior to closing of the source storage 108 by the primary operating environment at time t(1.4), as disclosed in FIG. 2A. As noted above in connection with FIG. 2A, this identifying of first modify map validity data may include identifying a first most recent transaction identifier in a journal of a file system of the source storage 108, such as the "Last Transaction ID" of "1244." Additionally or alternatively, as also noted above in connection with FIG. 2A, this identifying of first modify map validity data may include calculating a first checksum of file system metadata of a file system of the source storage 108, such as a hash value of "a905d4f7507ed449a2071e784fd7311a." The file system in either example may be an NTFS file system, or any other file system.

The method 300 may include step 306 of, upon opening of the storage by the primary operating environment, identifying second modify map validity data. Continuing with the above example, the backup module 114 of FIG. 1 may identify, at step 306, second modify map validity data 206 upon opening of the source storage 108 by the primary operating environment at time t(1.9), as disclosed in FIG. 2B. As noted above in connection with FIG. 2B, this identifying of the second modify map validity data 206 may include identifying a second most recent transaction identifier in the journal of the file system of the source storage 108, such as the "Last Transaction ID" of "1262." Additionally or alternatively, as also noted above in connection with FIG. 2B, this identifying of the second modify map validity data 206 may include calculating a second checksum of the file system metadata of the file system of the source storage 108, such as a hash value of "6026214cc830c25adb9e5287466d081 a."

The method 300 may include decision step 308 of determining whether the second modify map validity data matches the first modify map validity data. Continuing with the above example, the backup module 114 of FIG. 1 may determine, at step 308, whether the second modify map validity data 206 matches the first modify map validity data 204, as disclosed in FIGS. 2A-2B. For example, where the first modify map validity data 204 and the second modify map validity data 206 include a most recent transaction identifier in a journal of a file system of the source storage 108, the backup module 114 may determine, at step 308, that the newly-identified "Last Transaction ID" of "1262" does not match the previously-stored "Last Transaction ID" of "1244." Additionally or alternatively, where the first modify map validity data 204 and the second modify map validity data 206 include a calculated checksum of file system metadata of a file system of the source storage 108, the backup module may determine, at step 308, that the newly-calculated hash value of "6026214cc830c25adb9e5287466d081a" does not match the previously-stored hash value of "a905d4f7507ed449a2071e784fd7311a."

As noted above in connection with FIGS. 2A-2B, each of the primary operating environment and the alternate operating environment may be any type of operating environment that is capable of opening and modifying the source storage 108, such as a standard operating system, a pre-boot virus scanner, or a boot environment. Unlike the primary operating environment, however, the alternate operating environment may not be capable of tracking changes made to the source storage 108 during operation of the alternate operating environment. Without the tracking of changes during operation of the alternate operating environment, the modify map 202 that is maintained during operation of the primary operating environment may be rendered invalid. For this reason, the method 300 is able to detect that modifications were made to the source storage 108 during operation of the alternate operating environment in order to invalidate the modify map 202.

If it is determined at step 308 that the second modify map validity data matches the first modify map validity data (Yes at step 308), then the method 300 may proceed to step 310 of concluding that the storage was not modified in an alternate operating environment between the closing and the opening of the storage by the primary operating environment and to step 312 of performing an incremental backup or decremental backup of the storage using the modify map. Continuing with the above example, had the backup module 114 of FIG. 1 determined, at step 308, that the second modify map validity data 206 matches the first modify map validity data 204, then the backup module 114 of FIG. 1 would conclude, at step 310, that the source storage 108 was not modified in an alternate operating environment between the closing at time t(1.4) and the opening at time t(1.9) of the source storage 108 by the primary operating environment and would perform, at step 312, an incremental backup or decremental backup of the storage using the modify map 202, such as by creating the 1st incremental image backup 122 of FIG. 1 at time t(2).

If it is determined at step 308 that the second modify map validity data does not match the first modify map validity data (No at step 308), then the method 300 may proceed to step 314 of concluding that the storage was modified in an alternate operating environment between the closing and the opening of the storage by the primary operating environment and to step 316 of invalidating the modify map, and may then proceed to step 318 or step 320, as discussed below. Continuing with the above example, where the backup module 114 of FIG. 1 determines, at step 308, that the second modify map validity data 206 does not match the first modify map validity data 204, then the backup module 114 of FIG. 1 may conclude, at step 314, that the source storage 108 was modified in an alternate operating environment between the closing at time t(1.4) and the opening at time t(1.9) of the source storage 108 by the primary operating environment. The backup module 114 of FIG. 1 may then invalidate, at step 316, the modify map 202 of FIG. 2B. The invalidating of the modify map at step 316 may include discontinuing tracking, in the modify map, modifications to the storage that occur during operation of the primary operating environment until a next snapshot of the storage. For example, where the backup module 114 of FIG. 1 invalidates, at step 316, the modify map 202 at time t(1.9), the backup module 114 of FIG. 1 may discontinue tracking, at step 316, modifications to the source storage 108 that occur during operation of the primary operating environment until a next snapshot of the source storage 108. In other words, tracking may be discontinued between the invalidation of the modify map 202 at time t(1.9) at the snapshot taken at time t(2). Where the modify map 202 has been invalidated, any subsequent creation of an image backup, such as the 1st incremental image backup 122 of FIG. 1 at time t(2), may result in a valid image backup without any data integrity problems because the invalid modify map 202 will not be relied on during the creation of the image backup.

The method 300 may include step 318 of performing a full backup of the storage or step 320 of performing a full compare between the storage and a most recent backup of the storage prior to performing an incremental backup or a decremental backup of the storage. Continuing with the above example, the backup module 114 of FIG. 1 may perform, at step 318, a full backup of the source storage 108 at time t(2), instead of an incremental backup or a decremental backup of the source storage 108 at time t(2), due to the invalidated modify map 202. In this manner, no modifications that were made to the source storage 108 by the alternate operating environment will be lost in the image backup made at time t(2). Alternatively, the backup module 114 of FIG. 1 may perform, at step 320, a full compare between the source storage 108 and a most recent image backup of the source storage 108, such as the full image backup 120 that was created at time t(1), prior to performing an incremental backup or a decremental backup of the source storage 108 at time t(2). In this manner, the full compare at time t(2) can be employed to create a valid modify map, to replace the invalidated modify map 202, for use in the creation of a new incremental or decremental image backup at time t(2), such as the 1st incremental image backup 122 of FIG. 1. It is understood that a full compare may skip the comparison of free blocks and/or certain undesired allocated blocks, such as blocks belonging to files whose contents are not necessary for restoration purposes, such as virtual memory pagination files and machine hibernation state files.

It is understood that the foregoing discussion of the method 300 is but one possible implementation of a method for detecting modifications to a storage that occur in an alternate operating environment, and various modifications are possible and contemplated. For example, the method 300 may be modified to remove steps 310, 312, 318, and 320.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for detecting modifications to a source storage that occur in an alternate operating environment, the method comprising:
   tracking, in a modify map, modifications to a source storage that occur during operation of a primary operating environment;

identifying a first most recent transaction identifier in a journal of a file system of the source storage prior to closing of the source storage by the primary operating environment;

upon opening of the source storage by the primary operating environment, identifying a second most recent transaction identifier in the journal;

determining that the second most recent transaction identifier does not match the first most recent transaction identifier; and in response to determining that the second most recent transaction identifier does not match the first most recent transaction identifier:

concluding that the source storage was modified in an alternate operating environment between the closing and the opening of the source storage by the primary operating environment; and invalidating the modify map.

2. The method as recited in claim 1, wherein the invalidating of the modify map includes discontinuing tracking, in the modify map, modifications to the source storage that occur during operation of the primary operating environment until a next snapshot of the source storage.

3. The method as recited in claim 1, further comprising:
performing a full backup, instead of an incremental backup or a decremental backup, of the source storage due to the invalidated modify map.

4. The method as recited in claim 1, further comprising:
performing a full compare between the source storage and a most recent backup of the source storage prior to performing an incremental backup or a decremental backup of the source storage due to the invalidated modify map.

5. The method as recited in claim 1, wherein:
the primary operating environment is an operating system; and
the tracking is performed by a backup module that executes upon opening the source storage within the operating system and prior to any writes by the operating system to the source storage.

6. The method as recited in claim 5, wherein:
the alternate operating environment is a second operating system; and
the backup module is not capable of tracking changes made to the source storage during operation of the second operating system.

7. The method as recited in claim 5, wherein:
the alternate operating environment is a pre-boot virus scanner; and
the backup module is not capable of tracking changes made to the source storage during operation of the pre-boot virus scanner.

8. The method as recited in claim 5, wherein:
the alternate operating environment is a boot environment; and
the backup module is not capable of tracking changes made to the source storage during operation of the boot environment.

9. The method as recited in claim 5, wherein the file system of the source storage is a New Technology File System (NTFS) file system.

10. One or more non-transitory computer-readable media storing one or more programs that are configured, when executed, to cause one or more processors to perform the method as recited in claim 1.

11. A method for detecting modifications to a source storage that occur in an alternate operating environment, the method comprising:

tracking, in a modify map, modifications to a source storage that occur during operation of a primary operating environment;

calculating a first checksum of file system metadata of a file system of the source storage prior to closing of the source storage by the primary operating environment;

upon opening of the source storage by the primary operating environment, calculating a second checksum of the file system metadata of the file system of the source storage;

determining that the second checksum does not match the first checksum; and in response to determining that the second checksum does not match the first checksum:

concluding that the source storage was modified in an alternate operating environment between the closing and the opening of the source storage by the primary operating environment; and invalidating the modify map.

12. The method as recited in claim 11, wherein the invalidating of the modify map includes discontinuing tracking, in the modify map, modifications to the source storage that occur during operation of the primary operating environment until a next snapshot of the source storage.

13. The method as recited in claim 11, further comprising:
performing a full backup, instead of an incremental backup or a decremental backup, of the source storage due to the invalidated modify map.

14. The method as recited in claim 11, further comprising:
performing a full compare between the source storage and a most recent backup of the source storage prior to performing an incremental backup or a decremental backup of the source storage due to the invalidated modify map.

15. The method as recited in claim 11, wherein:
the primary operating environment is an operating system; and
the tracking is performed by a backup module that executes upon opening the source storage within the operating system and prior to any writes by the operating system to the source storage.

16. The method as recited in claim 15, wherein:
the alternate operating environment is a second operating system; and
the backup module is not capable of tracking changes made to the source storage during operation of the second operating system.

17. The method as recited in claim 15, wherein:
the alternate operating environment is a pre-boot virus scanner; and
the backup module is not capable of tracking changes made to the source storage during operation of the pre-boot virus scanner.

18. The method as recited in claim 15, wherein:
the alternate operating environment is a boot environment; and
the backup module is not capable of tracking changes made to the source storage during operation of the boot environment.

19. The method as recited in claim 15, wherein:
the file system of the source storage is a New Technology File System (NTFS) file system; and the first checksum and the second checksum are calculated on a log of the file system metadata of the NTFS file system.

20. One or more non-transitory computer-readable media storing one or more programs that are configured, when executed, to cause one or more processors to perform the method as recited in claim 11.

* * * * *